US006886040B1

(12) United States Patent
Fitzgerald

(10) Patent No.: US 6,886,040 B1
(45) Date of Patent: *Apr. 26, 2005

(54) CODEC-INDEPENDENT TECHNIQUE FOR MODULATING BANDWIDTH IN PACKET NETWORK

(75) Inventor: Cary W. Fitzgerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,232

(22) Filed: May 8, 2002

Related U.S. Application Data

(63) Continuation of application No. 09/181,947, filed on Oct. 28, 1998, now Pat. No. 6,421,720.

(51) Int. Cl.[7] ............................................ G06F 15/173
(52) U.S. Cl. ..................................... 709/224; 709/233
(58) Field of Search ................................ 709/221–224, 709/231–234; 370/401, 466; 712/221

(56) References Cited

U.S. PATENT DOCUMENTS

| | | | | |
|---|---|---|---|---|
| 4,731,816 A | | 3/1988 | Hughes-Hartogs | 379/98 |
| 4,769,815 A | * | 9/1988 | Hinch et al. | 370/94 |
| 4,771,391 A | * | 9/1988 | Blasbalg | 709/232 |
| 5,115,429 A | * | 5/1992 | Hluchyj et al. | 370/84 |
| 5,231,633 A | * | 7/1993 | Hluchyj et al. | 370/94.1 |
| 5,384,770 A | * | 1/1995 | Mays et al. | 370/300 |
| 5,506,844 A | * | 4/1996 | Rao | 370/48 |
| 5,541,919 A | * | 7/1996 | Yong et al. | 370/416 |
| 5,764,645 A | * | 6/1998 | Bernet et al. | 370/464 |
| 5,826,032 A | * | 10/1998 | Finn et al. | 709/236 |
| 5,940,479 A | * | 8/1999 | Guy et al. | 379/93.01 |
| 6,002,669 A | * | 12/1999 | White | 370/235 |
| 6,003,089 A | * | 12/1999 | Shaffer et al. | 709/223 |
| 6,005,871 A | * | 12/1999 | Petersen et al. | 370/474 |
| 6,006,253 A | * | 12/1999 | Kumar et al. | 709/204 |
| 6,052,368 A | * | 4/2000 | Aybay | 370/357 |
| 6,075,770 A | * | 6/2000 | Chang et al. | 370/395.21 |
| 6,298,057 B1 | * | 10/2001 | Guy et al. | 370/389 |
| 6,370,163 B1 | * | 4/2002 | Shaffer et al. | 370/519 |
| 6,421,720 B1 | * | 7/2002 | Fitzgerald | 709/224 |
| 6,466,586 B1 | * | 10/2002 | Darveau et al. | 370/468 |
| 2002/0018465 A1 | * | 2/2002 | Rosenberg | 370/356 |
| 2002/0090114 A1 | * | 7/2002 | Rhoads et al. | 382/100 |
| 2002/0093982 A1 | * | 7/2002 | Joy et al. | 370/468 |
| 2003/0053462 A1 | * | 3/2003 | Garcia et al. | 370/394 |

FOREIGN PATENT DOCUMENTS

| | | | | |
|---|---|---|---|---|
| EP | 942560 | * | 9/1999 | H04L/12/64 |

OTHER PUBLICATIONS

Lettieri et al., "Adaptive Frame Length Control for Improving Wireless Link:", 1998, IEEE, pp. 564–571.*
Hashimoto, "End–to End QoS Archetecture for Continous Media Services", 1998, IEEE, pp. 490–495.*

* cited by examiner

*Primary Examiner*—Bunjob Jaroenchonwanit
(74) *Attorney, Agent, or Firm*—Marger Johnson & McCollom, PC

(57) ABSTRACT

The size of packet payloads are varied according to the amount of congestion in a packet network. More data is put in packet payloads when more congestion exits in the packet network. When network congestion is high, less network bandwidth is available for transmitting packets. Accordingly, the packet payloads are transmitted with larger payloads to reduce the percentage of overhead in each packet. When there is little or no network congestion smaller packet payloads are transmitted. The additional overhead created in transmitting smaller packets is acceptable when there is little or no network congestion because the network currently has excess bandwidth. Thus, the packet payloads are dynamically adjusted to use network resources more effectively.

31 Claims, 6 Drawing Sheets

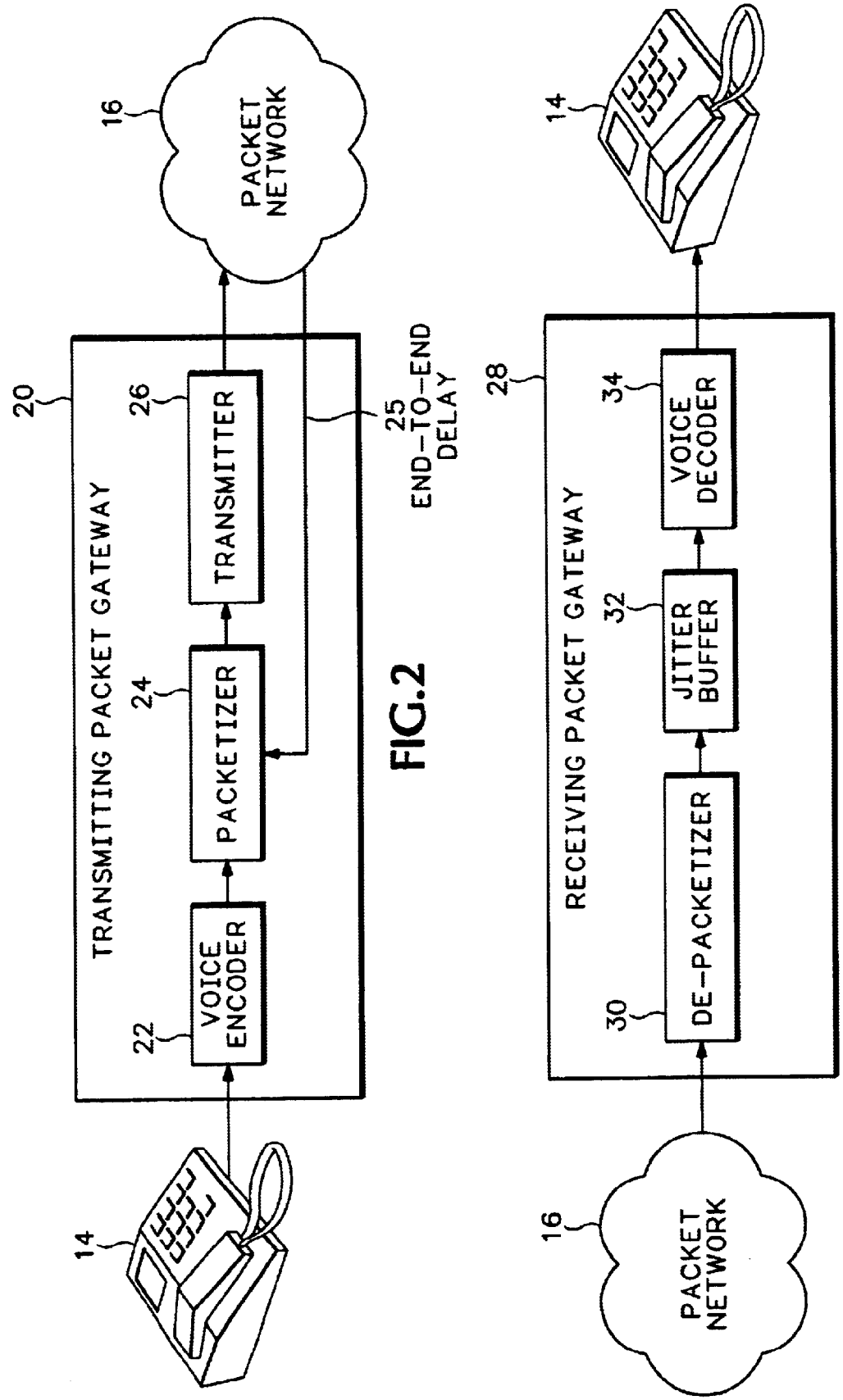

CODEC-INDEPENDENT TECHNIQUE FOR MODULATING BANDWIDTH IN PACKET NETWORK

This application is a continuation of prior U.S. Ser. No. 09/181,947, filed Oct. 28, 1998 now U.S. Pat. No. 6,421,720.

BACKGROUND OF THE INVENTION

This invention relates generally to packet networks and more particularly to a system for adapting packet payload size to the amount of network congestion.

A data stream is transmitted over a packet network by first formatting the data stream into multiple discrete packets. For example, in Voice Over Internet Protocol (VoIP) applications, a digitized audio stream is quantized into packets that are placed onto a packet network and routed to a packet telephony receiver. The receiver converts the packets back into a continuous digital audio stream that resembles the input audio stream. A codec (a compression/decompression algorithm) is used to reduce the communication bandwidth required for transmitting the audio packets over the network.

A large amount of network bandwidth is required for overhead when a data steam is converted and transmitted as packets. For example, in Realtime Transport Protocol (RTP)-encapsulated VoIP, a very common codec technique packetizes two 10 millisecond (ms) frames of speech into one audio packet. For a 8 kilobit per second (Kbit/s) coder, the 20 milliseconds of speech uses 20 bytes of the audio packet. There are an additional 40 bytes of the audio packet used for overhead, 20 bytes for an IP header, 8 bytes for an UDP header, and 12 bytes for a RTP header. The overhead to payload ratio is then 2 to 1, with two bytes of packet header for every one byte of audio packet payload.

When the packet network is congested, it is important to use network bandwidth efficiently. When there is too much congestion, a network processing node may drop some of the transmitted packets. Depending upon the speech encoding algorithm used in the audio encoder, the sound quality of the audio signal degenerates rapidly as more packets are discarded. The large overhead required for transmitting a data stream over the packet network substantially increases this network congestion causing more packets to be delayed or even dropped, in turn, reducing the quality of data transmitted over the packet network.

Accordingly, a need remains for a system that uses network bandwidth more effectively to improve transmission quality of data streams in a packet network.

SUMMARY OF THE INVENTION

The size of packet payloads are dynamically adapted to the amount of congestion in a packet network. More data is put in packet payloads when more congestion exists in the packet network. When network congestion is high, less network bandwidth is available for transmitting packets. Accordingly, the packets are transmitted with larger payloads. When there is little or no network congestion smaller packet payloads are transmitted. The additional overhead created in transmitting smaller packets is acceptable when there is little or no network congestion because the network has excess bandwidth. When the network is congested, this excess bandwidth no longer exists. Thus, more payload is loaded into each packet to reduce the overhead to payload ratio and, in turn, reduce bandwidth consumption. Thus, the packet payloads are dynamically adjusted to use network resources more effectively. Some users may be willing to trade off the delay inherent in packing more frames into a packet for increased efficiency.

Data is transmitted over the packet network by first encoding a data stream into encoded data. The encoded data is converted by a packetizer into packets having a packet header and a packet payload. The packetizer transmits the packets over the packet network to a receiving endpoint while monitoring congestion in the packet network.

In one embodiment of the invention, the data stream is an audio or video data stream generated by a telephone. The packetizer packetizes the encoded audio data into audio packets having a header and an audio payload. The size of the audio payload is increased by packing more audio frames into each audio packet. The size of audio payloads is then decreased when the packet network is no longer congested. Congestion is detected by measuring end-to-end delay between a transmitting gateway and a receiving gateway using an existing protocol such as RTCP.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a schematic diagram of a transmitting gateway used in the packet telephony system shown in FIG. 1.

FIG. 3 is a schematic diagram of a receiving gateway used in the packet telephony system shown in FIG. 1.

DETAILED DESCRIPTION

Figure 1:
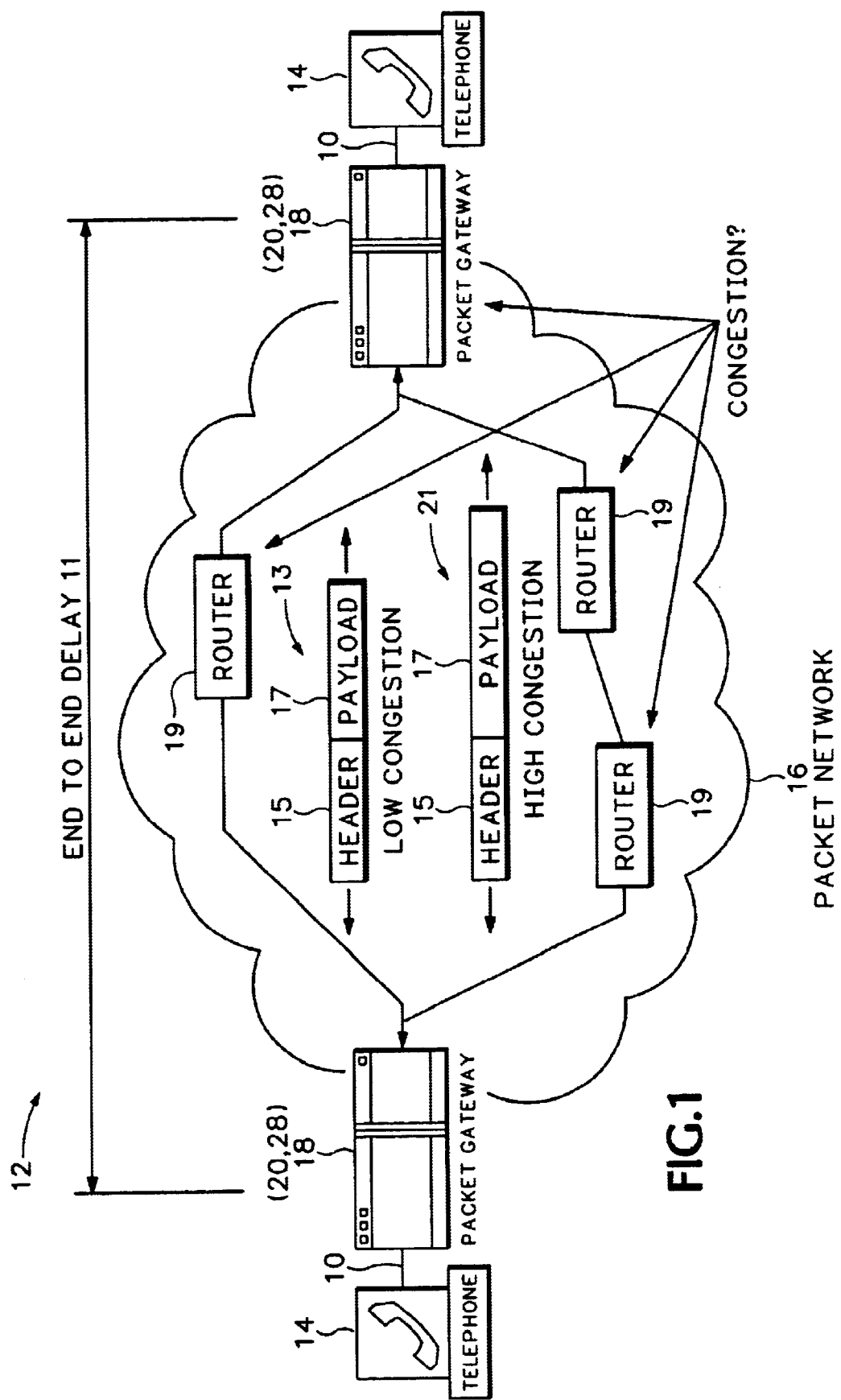
FIG. 1 is a schematic diagram of a packet telephony system that dynamically varies the size of audio packets according to network congestion.

FIG. 1 shows the general topology of a packet telephony system 12 that varies the size of packet payloads according to measured network congestion. It should be understood that the invention is applicable to any application where streaming or real-time data is packetized for transmission over a packet network. For example, the invention is equally applicable to video streams or multimedia data streams.

The packet telephony system 12 includes multiple telephone handsets 14 connected to a packet network 16 through gateways 18. The packet gateways 18 each include a codec for converting audio signals into audio packets and converting the audio packets back into audio signals. The handsets 14 are traditional telephones. Gateways 18 and the codecs used by the gateways 18 are any one of a wide variety of commercially available devices used for connecting the handsets 14 to the packet network 16. For example, the gateways 18 can be Voice Over Internet Protocol (VoIP) telephones or personal computers that include a digital signal processor (DSP) and software for encoding audio signals into audio packets.

The gateways 18 operate as a transmitting gateway when encoding audio signals into audio packets and transmitting the audio packets over the packet network 16 to a receiving gateway. The gateways 18 operate as the receiving gateway when receiving audio packets over the packet network 16 and decoding the audio packets back into audio signals.

A gateway transmit path is shown in the transmitting packet gateway 20 in FIG. 2. The transmitting packet gateway 20 includes a voice encoder 22, a packetizer 24, and a transmitter 26. Voice encoder 22 implements the compression half of a codec. Packetizer 24 accepts compressed audio data from encoder 22 and formats the data into packets for transmission. The packetizer 24 receives an end-to-end delay signal 25 back from packet network 16. The end-to-end delay signal 25 is generated in various ways such as from a Real Time Protocol (RTP) report sent back from a receiving packet gateway 28 shown in FIG. 3. A transmitter 26 places the audio packets from packetizer 24 onto packet network 16.

The receiving packet gateway 28 is shown in FIG. 3. The receiving gateway 28 reverses the process in transmitting gateway 20. A depacketizer 30 accepts packets from packet network 18 and separates out the audio frames. A jitter buffer 32 buffers the audio frames and outputs them to a voice decoder 34 in an orderly manner. The voice decoder 34 implements the decompression half of the codec employed by voice encoder 22 (FIG. 2). The decoded audio frames are then output to telephone 14. The operations necessary to transmit and receive audio packets performed by the voice encoder 22, decoder 34, transmitter 26, packetizer 24 and depacketizer 30 are well known and, therefore, not described in further detail.

Referring back to FIG. 1, an end-to-end packet delay 11 is used to identify congestion occurring at any point in the packet network 16. Congestion is defined as heavy network utilization experienced by one or more network processing elements such as routers 19 and/or packet gateways 18. Congested network processing element(s) can "back-up", delaying processing and routing of packets 13 through the packet network 16. If the congestion is severe, packets may be discarded by one or more of the network processing elements.

To reduce congestion, the overhead to payload ratio between a packet header 15 and a packet payload 17 in the packet 13 is adapted to the current congestion conditions in packet network 16. When there is little or no congestion on the packet network 16, a smaller packet payload 17 is packed into each voice packet 13. The delay in transmitting the audio packet 13 is, in turn, shorter because the transmitting gateway 20 encodes and transmits a shorter portion of an audio stream 10 output from one of telephones 14.

When the packet network 16 is congested, the transmitting gateway 20 increases the amount of audio data (payload) 17 as shown in audio packet 21. The audio payload is dynamically increased while keeping header 15 the same size. Less network bandwidth is used to transmit the audio stream 10 because more audio data is transmitted using the same amount of packet overhead 15. This reduces congestion on the packet network 16 and reduces the likelihood of packets being dropped or further delayed.

Network congestion is inferred by the amount of time it takes the audio packets to travel between the transmitting gateway 20 and the receiving gateway 28. This end-to-end delay 11 is calculated using existing packet based voice protocols, such as Real Time Protocol (RTP RFC 1889) and Real Time Control Protocol (RTCP). RTP provides end-to-end transport for applications of streaming or real-time data, such as audio or video. RTCP provides estimates of network performance.

RTP and RTCP enable the receiving gateway to synchronize the received packets in the proper order so the user hears or sees the information correctly. Logical framing defines how the protocol "frames" or packages the audio or video data into bits (packets) for transport over a selected communications channel. Sequence numbering determines the order of data packets transported over a communications channel. RTCP also contains a system for determining end-to-end delay and periodically reporting that end-to-end delay back to the transmitting gateway 20. Any other dynamic measure of end-to-end delay or network congestion can similarly be used as an congestion identifier to packetizer 24.

Figure 4:
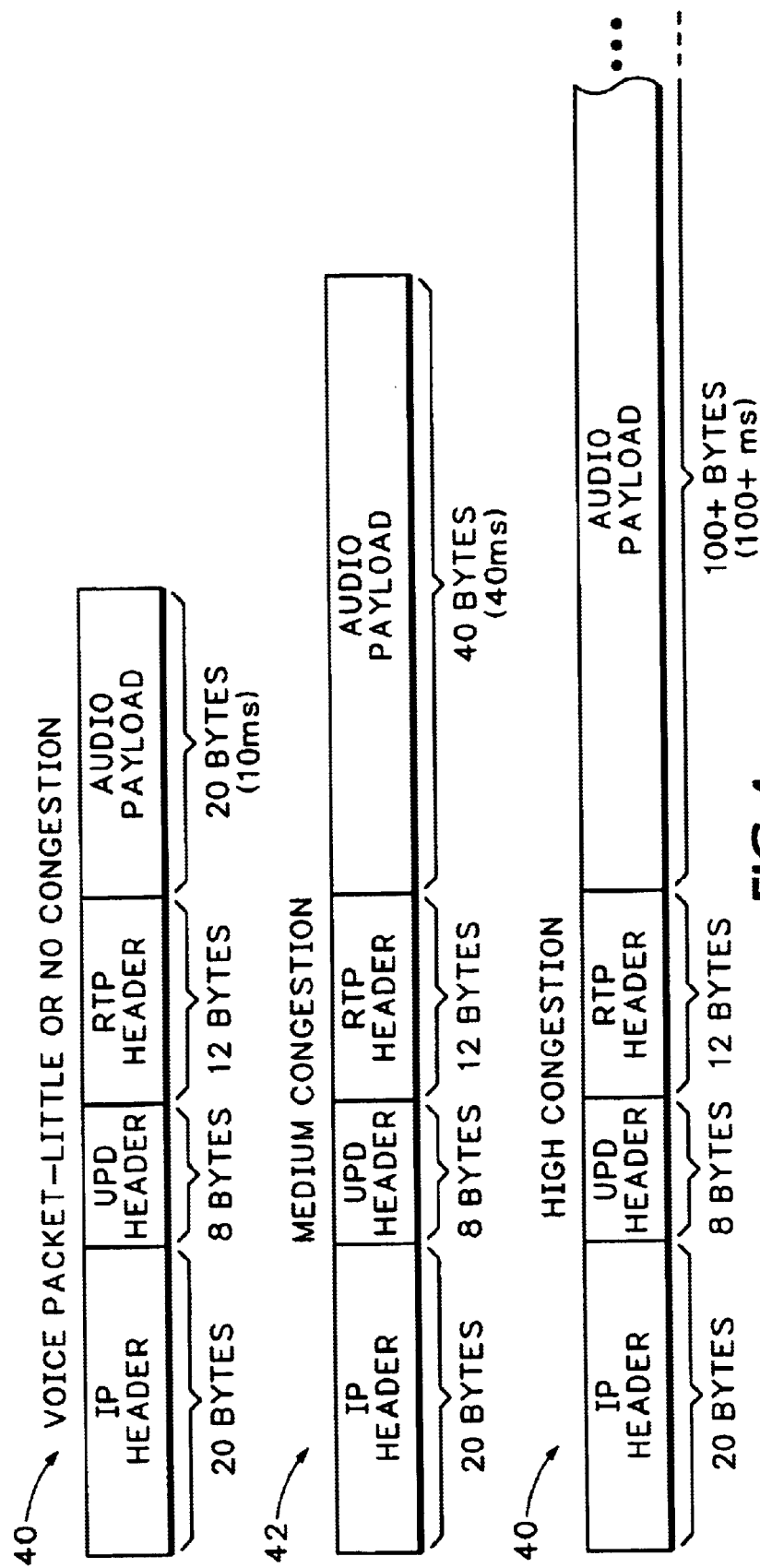
FIG. 4 is a schematic diagram of variable sized packet payloads transmitted by the transmitting gateway shown in FIG. 2.

Referring to FIG. 4, the network end-to-end 11 delay provided with the RTCP report is used by the packetizer 24 to automatically vary the number of audio frames placed in each packet payload. This amount of audio data typically varies from 10–20 ms up to some maximum such as 100 ms. However, smaller or larger audio payloads may be used depending on specific network conditions.

The audio packets 40, 42 and 44 are transmitted over the packet network 16 using an Internet Protocol (IP). The audio packets include an IP header that is 20 bytes long, a User Datagram Protocol (UDP) header that is 8 bytes long, an RTP header that is 12 bytes long, and a variable sized audio payload. With little or no network congestion, usually 20 ms of speech are packed into audio packet 40. The 20 ms of speech is encoded into approximately 20 bytes of packet payload. The 40 bytes of overhead including the IP header, UDP header, and RTP header in packet 40 takes up two thirds of audio packet 40. Every 20 ms. (50 times per second) a 60 byte packet 40 is then generated and transmitted by transmitting gateway 20 (FIG. 2).

When there is medium congestion in the packet network 16, audio packets similar to packet 42 are generated by the packetizer 24 (FIG. 2). The packet 42 carries 40 ms of audio data in a 40 byte packet payload but still uses only 40 bytes of overhead. The overhead ratio for transmitting 40 ms of speech is thereby reduced to one half of the total size of packet 42 at the cost of a 40 ms delay.

If heavy congestion is detected on the packet network 16, the packetizer 24 generates audio packets similar to packet 44. Packet 44 has a still larger audio payload of 100 ms. or more. The overhead ratio for transmitting 100 ms of speech is reduced further to one fifth of the total size of packet 44.

Figure 5:
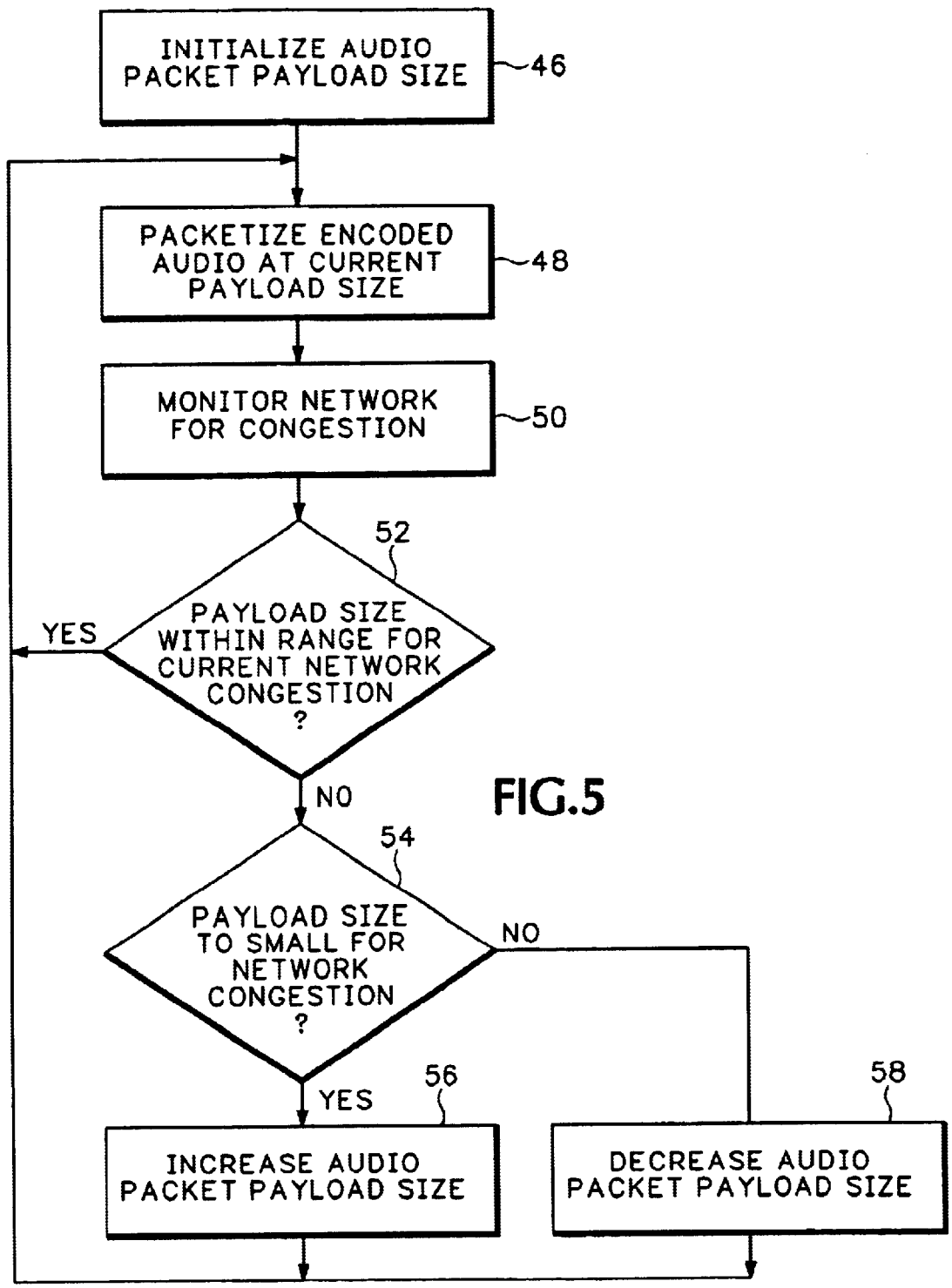
FIG. 5 is a flow diagram describing how a packetizer in the transmitting gateway shown in FIG. 2 operates.

It should be noted that the amount of audio data in each packet is varied independently of the audio encoder 22 (FIG. 22). Thus, the encoding scheme used to encode and decode the audio data does not have to be changed for different packet network conditions. This reduces encoder complexity. Because the size of audio packets and audio packet payloads is relayed in the packet header information, no modifications have to be made to existing network transport protocols. There are several well known algorithms for performing real-time adaptation that can be applied here. FIG. 5 demonstrates one, but the central idea of this invention does not rely on any specific adaptation algorithm.

FIG. 5 is a flow diagram showing in more detail how the packetizer 24 in FIG. 2 operates. The packetizer 22 is initialized for a given packet payload size in step 46. The packetizer 24 in step 48 packetizes encoded data from voice encoder 22 at the selected packet payload size. While packets are output by transmitter 26, the packetizer 24 in step 50 monitors the packet network 16 for congestion. Decision step 52 determines whether the current packet payload size is within a range compatible with the current network congestion condition. This is can be done using a table previously loaded into the packetizer 24. The table contains acceptable packet payload sizes for different end-to-end network delays.

If the payload size is within range, the packetizer 24 jumps back to step 48 and continues to packetize audio data at the current payload size. If the current payload size is not within an acceptable range for the current network congestion, decision step 54 determines whether the current packet payload is either too small or too large.

Decision step 54 decides whether the packet payload size is too small for the current end-to-end delay. If so, the packetizer 24 automatically increases the audio packet payload size in step 56. If the packet payload is too large, the audio packet payload size is automatically decreased by the packetizer 24 in step 58. The packetizer then jumps back to step 48 and packetizes audio data at the new packet payload size.

Figure 6:
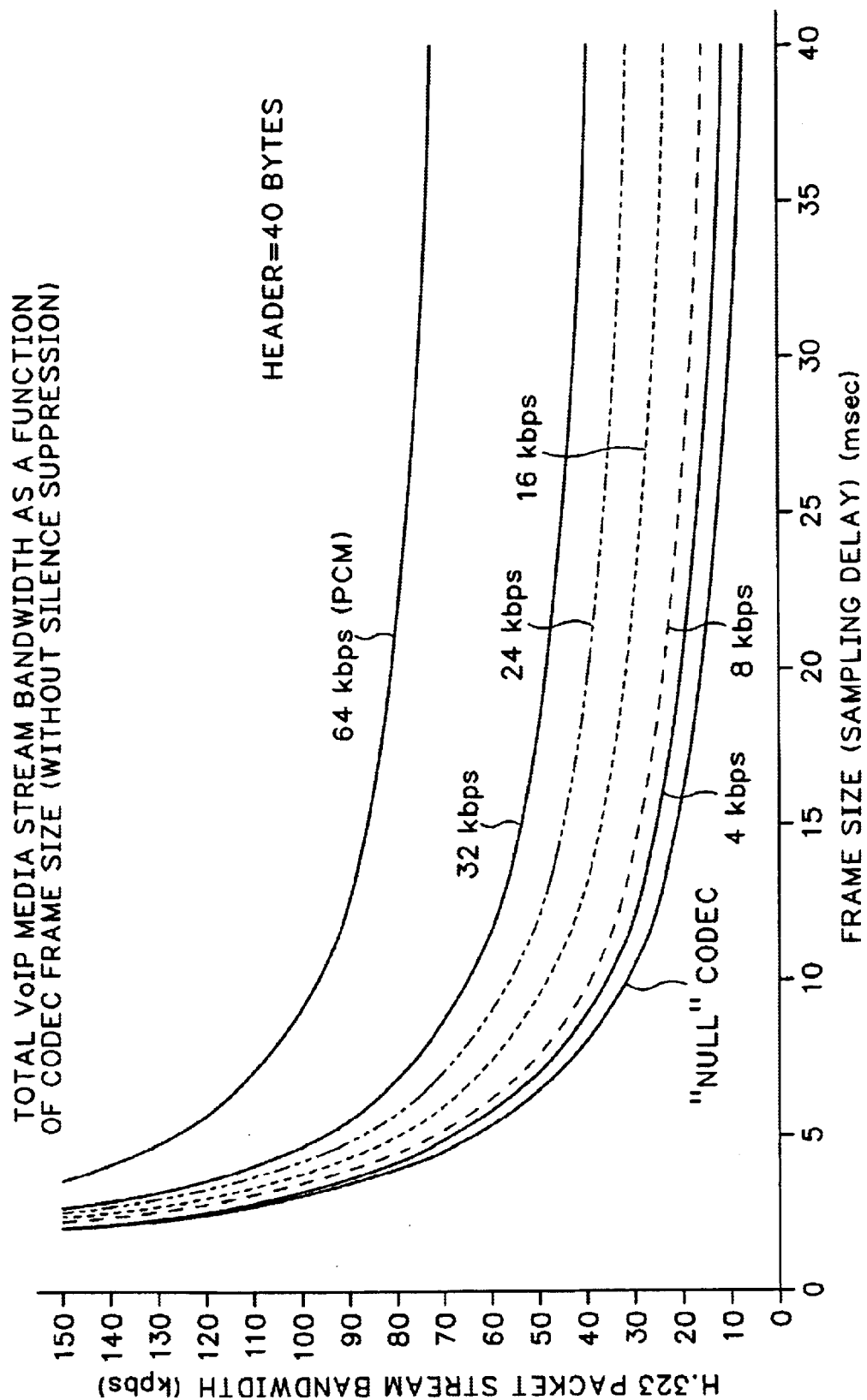
FIG. 6 is a graph showing network bandwidth consumption for different header to payload ratios.

FIG. 6 is a graph showing bandwidth consumption in a packet network for different header to payload ratios. Each line represents a different codec bit rates. This graph can be used as a reference in packetizer 24 for changing the packet payload size.

Figure 7:
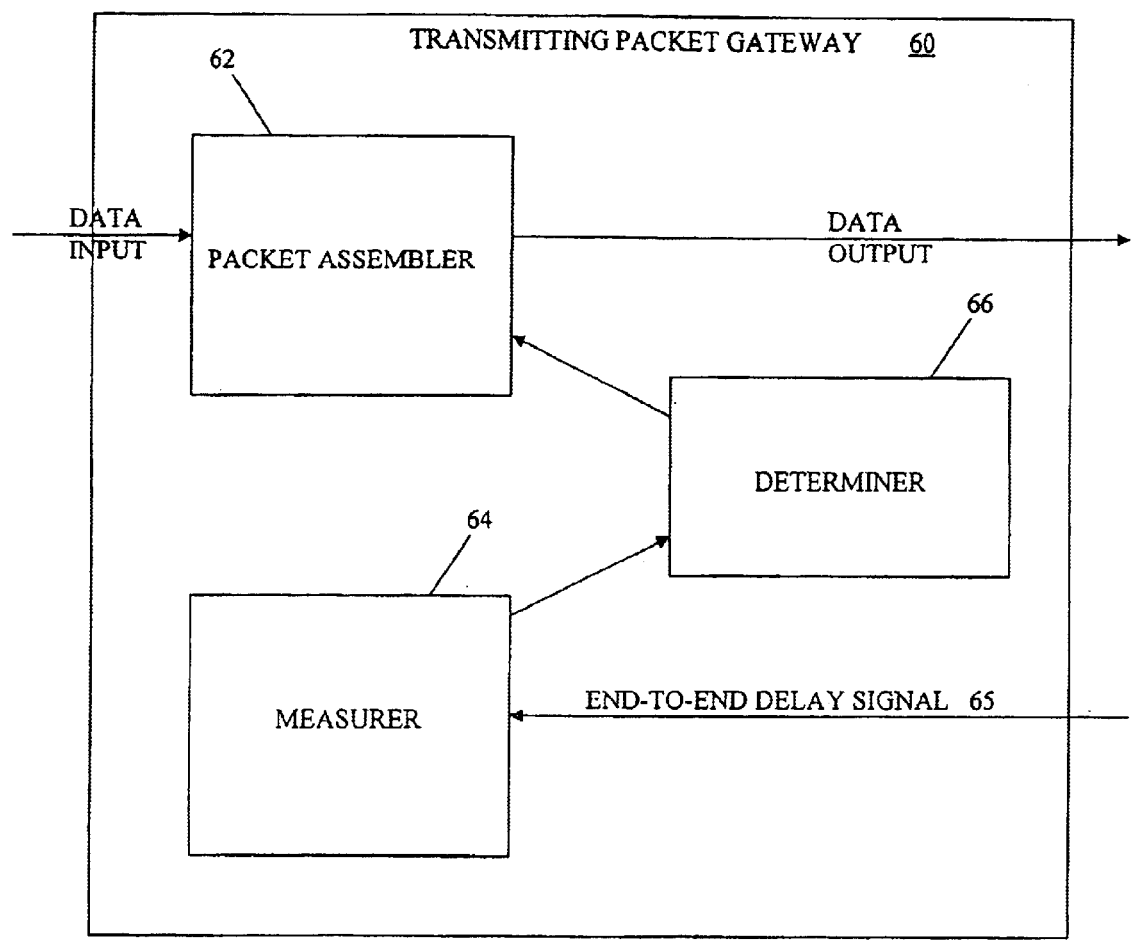
FIG. 7 is a schematic diagram of a transmitting packet gateway used in the packet telephony system shown in FIG. 1 according to another embodiment of the invention.

FIG. 7 is a schematic diagram of a transmitting packet gateway 60 used in the packet telephony system shown in FIG. 1 according to another embodiment of the invention. The transmitting packet gateway 60 includes a packet assembler 62, a measurer 64, and a determiner 66. The packet assembler 62 accepts data and formats the data into packets for transmission. The measurer 64 measures the amount of time it takes a transmitted packet to reach its destination by receiving an end-to-end delay signal 65 back from the packet network 16 (FIG. 2). The end-to-end delay signal 65 is generated in various ways as already explained for the embodiment of FIG. 2. The determiner 66 coupled to the measurer 64 is structured to vary data payload size based on the measured end-to-end delay signal. The determiner 66 also sends a signal indicating the selected payload size to an input of the packet assembler 62. The determination made by the determiner 66 of the payload size is based on the measurement of the end-to-end delay time made by the measurer 64. Thus payload size is varied, or selected, based on the measured end-to-end time delay. The data output consists of transmitted variable-sized data packets with the variability based on the data payload size.

The invention dynamically changes the overhead to packet payload ratio to more effectively adapt to current network congestion conditions. By improving network bandwidth efficiency, the quality of streaming and real-time data transmitted over the packet network is improved.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for transmitting packets over a packet network, comprising:
an interface transmitting multimedia packets having a packet header and a packet payload over the packet network; and
a processor monitoring an amount of delay for the packets transmitted over the packet network and dynamically increasing a size of the packet payload according to an increased amount of monitored delay of a transmitted multimedia packet, the processor remonitoring the amount of delay for the packets after the size of the packet payload has been varied and readjusting the size of the packet payload according to the amount of monitored delay in the packets after the payload size has been varied.

2. A system according to claim 1 wherein the processor dynamically increases the size of the packet payload without varying an encoding scheme used to encode the packet payload.

3. A system according to claim 1 wherein the delay is determined by the processor using a Real Time Control Protocol (RTCP) report.

4. A system according to claim 1 wherein the processor keeps the packet header at the same size regardless of the amount of delay.

5. A system according to claim 1 including an encoder for converting an audio stream into the packets.

6. A system according to claim 5 wherein the packet header includes an Internet Protocol (IP) header, a User Datagram Protocol (UDP) header and a Real-time Transport Protocol (RTP) header.

7. A system according to claim 5 wherein the encoder is coupled to a telephone that generates the audio stream.

8. A method for transmitting data, comprising:
transmitting multimedia packets containing payloads to a receiving device;
monitoring an amount of delay required for the transmitted multimedia packets to reach the receiving device;
varying a size of the payloads in the packets according to the amount of monitored delay;
remonitoring the amount of delay for the packets after the size of the payload has been varied; and
readjusting the size of the payloads in said packets according to the amount of monitored delay after the size of the payloads are varied.

9. A method according to claim 8 including dynamically varying the size of the payload independently of an encoding or decoding scheme used to encode or decode the payload.

10. A method according to claim 9 including measuring the delay using a Real-time Transport Protocol (RTP).

11. A method according to claim 8 including encoding audio data into the payloads.

12. A method according to claim 11 including increasing an amount of audio data in the payload by delaying transmission of the packets and encoding a larger amount of the audio data into the packets.

13. A method according to claim 12 including using at least 40 bytes for an audio header and at least 20 bytes for an audio payload in each packet when there is a first amount of packet delay and using at least 40 bytes for the audio header and 40 or more bytes for the payload when there is a second amount of packet delay, the second amount of delay greater than the first amount of delay.

14. A system for transmitting data, comprising:
means for transmitting multimedia packets containing payloads to a receiving device;
means for-measuring an amount of delay required for the multimedia packets to reach the receiving device;
means for varying a size of the payloads in the transmitted packets according to the amount of delay;
means for-remeasuring the amount of delay for the packets after the size of the payload has been varied; and
means for readjusting the size of the payloads in said packets according to the amount of measured delay after the size of the payloads are varied.

15. A system according to claim 14 including means for dynamically varying the size of the payload independently of an encoding or decoding scheme used to encode or decode the payload.

16. A system according to claim 15 including means for measuring the delay using a Real-time Transport Protocol (RTP).

17. A system according to claim 14 including means for encoding audio data into the payloads.

18. A system according to claim 17 including means for increasing an amount of audio data in the payload by delaying transmission of the packets and encoding a larger amount of the audio data into the packets.

19. A system according to claim 18 including means for using at least 40 bytes for an audio header and at least 20 bytes for an audio payload in each packet when there is a first amount of packet delay and using at least 40 bytes for the audio header and 40 or more bytes for the payload when there is-more than the first amount of packet delay.

20. An article comprising a machine-accessible medium having associated data that, when accessed, results in the following:

transmitting multimedia packets containing payloads to a receiving device;

measuring an amount of delay required for the multimedia packets to reach the receiving device;

varying a size of the payloads in the transmitted packets according to the amount of delay;

remeasuring the amount of delay for the packets after the size of the payload has been varied; and readjusting the size of the payloads in said packets according to the amount of measured delay after the size of the payloads are varied.

21. The machine-accessible medium of claim 20 including dynamically varying the size of the payload independently of an encoding or decoding scheme used to encode or decode the payload.

22. The machine-accessible medium of claim 21 including measuring the delay using a Real-time Transport Protocol (RTP).

23. The machine-accessible medium of claim 20 including encoding audio data into the payloads.

24. The machine-accessible medium of claim 23 including increasing an amount of audio data in the payload by delaying transmission of the packets and encoding a larger amount of the audio data into the packets.

25. The machine-accessible medium of claim 24 including using at least 40 bytes for an audio header and at least 20 bytes for an audio payload in each packet when there is a first amount of packet delay and using at least 40 bytes for the audio header and 40 or more bytes for the payload when there is a larger than the first amount of packet delay.

26. A system for transmitting packets over a packet network, comprising:

an interface for transmitting assembled packets over the packet network;

a packet assembler structured to combine a header packet having a first size with a one of a plurality of different sized data payloads, the packet assembler including an input;

a measurer structured to measure an amount of time it takes a transmitted multimedia packet to reach its destination, the measurer structured to repeat its measure one or more times; and a determiner coupled to the measurer and structured to dynamically vary a size of data payloads in relation with the header packet in the packet assembler, and to send a signal indicating the determined payload size to the input of the packet assembler.

27. The system according to claim 26 wherein the measurer uses a Real Time Control Protocol (RTCP) report.

28. The system according to claim 26 wherein the header packet always has the same size.

29. The system of claim 26 wherein the determiner is structured to determine a larger data payload when the amount of time for the transmitted multimedia packet increases from a previously measured amount of time.

30. The system of claim 29 wherein the determiner is structured to determine a smaller data payload when the amount of time for the transmitted multimedia packet decreases from a previously measured amount of time.

31. The system according to claim 26 wherein the packet assembler is coupled to a telephone.

* * * * *